(12) United States Patent
Llorca et al.

(10) Patent No.: US 10,356,185 B2
(45) Date of Patent: Jul. 16, 2019

(54) OPTIMAL DYNAMIC CLOUD NETWORK CONTROL

(71) Applicant: ALCATEL-LUCENT USA, INC., Murray Hill, NJ (US)

(72) Inventors: Jaime Llorca, Red Bank, NJ (US); Antonia Maria Tulino, Lincroft, NJ (US)

(73) Assignee: NOKIA OF AMERICA CORPORATION, Murray Hill, NJ (US)

( * ) Notice: Subject to any disclaimer, the term of this patent is extended or adjusted under 35 U.S.C. 154(b) by 240 days.

(21) Appl. No.: 15/094,568

(22) Filed: Apr. 8, 2016

(65) Prior Publication Data

US 2017/0295247 A1 Oct. 12, 2017

(51) Int. Cl.
*G06F 9/50* (2006.01)
*H04L 12/24* (2006.01)
*H04L 29/08* (2006.01)
*H04L 12/911* (2013.01)

(52) U.S. Cl.
CPC ............ *H04L 67/16* (2013.01); *G06F 9/5072* (2013.01); *H04L 41/5041* (2013.01); *H04L 47/783* (2013.01); *H04L 67/125* (2013.01); *H04L 41/12* (2013.01); *H04L 41/5096* (2013.01); *H04L 67/10* (2013.01)

(58) Field of Classification Search
CPC ...... G06F 9/505; G06F 9/5083; G06F 9/5088; H04L 29/08144; H04L 29/08171; H04L 29/08072; H04L 29/06; H04L 43/00; H04L 12/2602; H04L 41/22

USPC .......................................................... 709/224
See application file for complete search history.

(56) References Cited

U.S. PATENT DOCUMENTS

| | | | | |
|---|---|---|---|---|
| 6,928,477 B1 * | 8/2005 | Leymann | ................ | G06F 9/505 709/219 |
| 9,027,024 B2 * | 5/2015 | Mick | .................... | H04L 43/0817 718/1 |
| 9,843,485 B2 * | 12/2017 | Desai | .................... | H04L 41/147 |

(Continued)

OTHER PUBLICATIONS

Cohen, "Near Optimal Placement of Virtual Network Functions", IEEE Conference on Computer Communications, 2015, 2015.

(Continued)

*Primary Examiner* — Mahran Y Abu Roumi
(74) *Attorney, Agent, or Firm* — Kramer Amado, P.C.

(57) ABSTRACT

Various exemplary embodiments relate to a network node in a distributed dynamic cloud, the node including: a memory; and a processor configured to: observe a local queue backlog at the beginning of a timeslot, for each of a plurality of commodities; compute a processing utility weight for a first commodity based upon the local queue backlog of the first commodity, the local queue backlog of a second commodity, and a processing cost; where the second commodity may be the succeeding commodity in a service chain; compute an optimal commodity using the processing utility weights; wherein the optimal commodity is the commodity with the highest utility weight; assign the number of processing resource units allocated to the timeslot to zero when the processing utility weight of the optimal commodity is less than or equal to zero; and execute processing resource allocation and processing flow rate assignment decisions based upon the optimal commodity.

20 Claims, 3 Drawing Sheets

(56) References Cited

U.S. PATENT DOCUMENTS 9,891,946 B2\* 2/2018 Bavishi ................ G06F 9/4856
2006/0026599 A1\* 2/2006 Herington ............ G06F 9/5083
718/105

OTHER PUBLICATIONS

Neely, "Dynamic Power Allocation and Routing for Time Varying Wireless Networks", IEEE, 2003, 2003.
Neely, "Energy Optimal Control for Time-Varying Wireless Networks", IEEE Transactions on Information Theory, 2006.
Neely, "Optimal Backpressure Routing for Wireless Networks With Multi-Receiver Diversity", University of Southern California, Mar. 2006.
Notification of Transmittal of the International Search Report and Written Opinion of the International Searching Authority, or the Declaration, dated Jun. 30, 2017 for PCT/US2017/024940.
Li, et al., "QoS-Aware Service Selection in Geographically Distributed Clouds", 2013 22nd International Conference on Computer Communication and Networks, IEEE, Jul. 30, 2013, pp. 1-5.

\* cited by examiner

OPTIMAL DYNAMIC CLOUD NETWORK CONTROL

BACKGROUND

Distributed cloud networking enables the deployment of network services in the form of interconnected virtual network functions instantiated over general purpose hardware at multiple cloud locations distributed across the network. The service distribution problem may be to find the placement of virtual functions and the routing of network flows that meet a given set of demands with minimum cost.

SUMMARY

In light of the present need for optimal dynamic cloud network control, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a network node in a distributed dynamic cloud, the node including: a memory; and a processor configured to: observe a local queue backlog at the beginning of a timeslot, for each of a plurality of commodities; compute a processing utility weight for a first commodity based upon the local queue backlog of the first commodity, the local queue backlog of a second commodity, and a processing cost; where the second commodity may be the succeeding commodity in a service chain; compute an optimal commodity using the processing utility weights; wherein the optimal commodity is the commodity with the highest utility weight; assign the number of processing resource units allocated to the timeslot to zero when the processing utility weight of the optimal commodity is less than or equal to zero; and execute processing resource allocation and processing flow rate assignment decisions based upon the optimal commodity.

Various exemplary embodiments relate to a method of optimizing cloud control on a network node in a distributed dynamic cloud, the method including observing a local queue backlog at the beginning of a timeslot, for each of a plurality of commodities; computing a processing utility weight for a first commodity based upon the local queue backlog of the first commodity, the local queue backlog of a second commodity, and a processing cost; where the second commodity may be the succeeding commodity in a service chain; computing an optimal commodity using the processing utility weights; wherein the optimal commodity is the commodity with the highest utility weight; assigning the number of processing resource units allocated to the timeslot to zero when the processing utility weight of the optimal commodity is less than or equal to zero; and executing processing resource allocation and processing flow rate assignment decisions based upon the optimal commodity.

BRIEF DESCRIPTION OF THE DRAWINGS

In order to better understand various exemplary embodiments, reference is made to the accompanying drawings, wherein.

DETAILED DESCRIPTION

Figure 1:
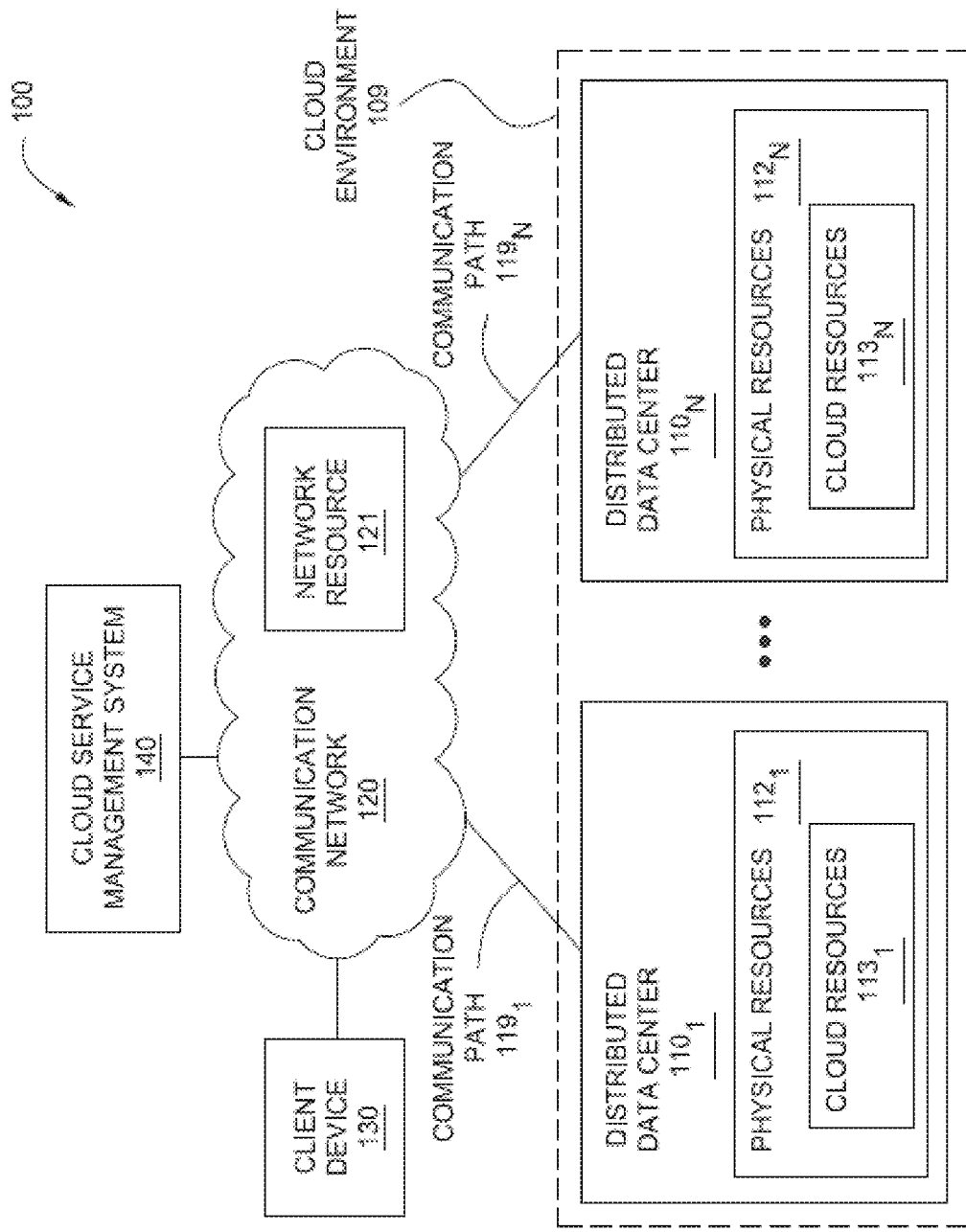
FIG. 1 illustrates an exemplary distributed cloud system including a distributed cloud environment and a controller configured to control distribution of cloud services within the distributed cloud environment.

The description and drawings presented herein illustrate various principles. It will be appreciated that those skilled in the art will be able to devise various arrangements that, although not explicitly described or shown herein, embody these principles and are included within the scope of this disclosure. As used herein, the term, "or" refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein. Further, while various exemplary embodiments are described with regard to cloud networks it will be understood that the techniques and arrangements described herein may be implemented to facilitate network control in other types of systems that implement multiple types of data processing or data structure.

Distributed cloud networking builds on network functions virtualization (NFV) and software defined networking (SDN) to enable the deployment of network services in the form of elastic virtual network functions instantiated over commercial off the shelf (COTS) servers at multiple cloud locations and interconnected via a programmable network fabric. In this evolved virtualized environment, network operators may host a variety of highly adaptable services over a common physical infrastructure, reducing both capital and operational expenses, while providing quality of service guarantees. While this approach may be very attractive for network providers, it may pose several technical challenges. Chief among them may include how to efficiently assign network functions to the various servers in the network. These placement decisions may be coordinated with the routing of network flows through the appropriate network functions, and with resource allocation decisions that determine the amount of resources (for example, virtual machines) allocated to each function.

The problem of placing virtual network functions in distributed cloud networks may be formulated as a generalization of Generalized Assignment (GA) and Facility Location (FA), and a (O(1), O(1)) bi-criteria approximation with respect to both overall cost and capacity constraints may be provided in a prior art solution. In another prior art solution titled cloud service distribution problem (CSDP), the goal includes finding the placement of network functions and the routing of network flows that minimize the overall cloud network cost. The CSDP may be formulated as a minimum cost network flow problem, in which flows consume both network and cloud resources as they go through the required virtual functions. The CSDP may be shown to admit polynomial-time solutions under linear costs and fractional flows. However, both of these solutions include two main limitations:

A static scenario may be considered with a priori known demands. However, with the increasing heterogeneity and dynamics inherent to both service demands and the underlying cloud network, one may argue that online algorithms that enable rapid adaptation to changes in network conditions and service demands are essential. The solutions consider a centralized optimization. However, the complexity associated with the resulting global optimization problem and the need to have global knowledge of the service demands, limits the use of centralized algorithms, specially in large-scale distributed cloud networks and under time-varying demands.

Embodiments include a dynamic cloud network control (DCNC) algorithm based on augmenting a Lyapunov drift-plus-penalty control method, which had only been used in traditional (transmission) networks, to account for both transmission and processing flows, consuming network and cloud resources. However, several issues remain open for improvement: i) only expected time-averaged performance guarantees are previously considered, and ii) the resulting network delay may be significant, especially in lightly loaded networks.

In the embodiments described herein: i) the bounds for time average cost and time average occupancy (total queue backlog) may be provided with probability 1 (instead of in expected time average); ii) a key shortest transmission-plus-processing distance bias extension to the DCNC algorithm may be designed, which may be shown to significantly reduce network delay without compromising throughput nor overall cloud network cost; and iii) simulation results may be presented that illustrate the effect of incorporating the shortest transmission-plus-processing distance bias into the DCNC algorithm, as well as its efficiency in reducing overall cloud network cost and delay for different parameter settings and network scenarios that include up to 110 clients.

Referring now to the drawings, in which like numerals refer to like components or steps, there are disclosed broad aspects of various exemplary embodiments.

FIG. 1 depicts an exemplary distributed cloud system including a distributed cloud environment and a controller configured to control distribution of cloud services within the distributed cloud environment.

The distributed cloud system (DCS) 100 includes a distributed cloud environment 109 having a set of distributed data centers (DDCs) 1101-110N (collectively, DDCs 110), a communication network (CN) 120, a client device (CD) 130, and a cloud service management system (CSMS) 140.

The DDCs 110 may be configured to support cloud services for cloud consumers. The cloud services may include cloud computing services, Infrastructure as a Service (IaaS), or the like. For example, the cloud services may include augmented reality services, immersive video services, real-time computer vision services, tactile internet services, network virtualization services (e.g., for one or more of routing, data flow processing, charging, or the like, as well as various combinations thereof), or the like. The DDCs 110 may include various types and configurations of resources, which may be used to support cloud services for cloud consumers. The resources may include various types and configurations of physical resources, which may be used to support various types and configurations of virtual resources. The DDCs 1101-110D may communicate with CN 120 via communication paths 1191-119D (collectively, communication paths 119), respectively.

The DDCs 110 include respective sets of physical resources (PRs) 1121-112D (collectively, PRs 112) which may be used to provide cloud services for cloud consumers. For example, PRs 112 of a DDC 110 may include computing resources, memory resources, storage resources, input-output (I/O) resources, networking resources, or the like. For example, PRs 112 of a DDC 110 may include servers, processor cores, memory devices, storage devices, networking devices (e.g., switches, routers, or the like), communication links, or the like, as well as various combinations thereof. For example, PRs 112 of a DDC 110 may include host servers configured to host virtual resources within the DDC 110 (e.g., including server blades organized in racks and connected via respective top-of-rack (TOR) switches, hypervisors, or the like), aggregating switches and routers configured to support communications of host servers within the DDC 110 (e.g., between host servers within the DDC 110, between host servers of the DDC 110 and devices located outside of the DDC 110, or the like), or the like, as well as various combinations thereof. The typical configuration and operation of PRs of a datacenter (e.g., such as PRs 112 of one or more of the DDCs 110) will be understood by one skilled in the art.

The PRs 112 of the DDCs 110 may be configured to support respective sets of cloud resources (CRs) 1131-113D (collectively, CRs 113) for cloud consumers. For example, CRs 113 supported using PRs 112 of a DDC 110 may include virtual computing resources, virtual memory resources, virtual storage resources, virtual networking resources (e.g., bandwidth), or the like, as well as various combinations thereof. The CRs 113 supported using PRs 112 of a DDC 110 may be provided in the form of virtual machines (VMs), virtual applications, virtual application instances, virtual file systems, or the like, as well as various combinations thereof. The allocation of CRs 113 of DDCs 110 may be performed by CSMS 140 responsive to requests for cloud services from cloud consumers (e.g., a request for a cloud service received from client device 130 or any other suitable source of such a request). It will be appreciated that the typical configuration and operation of VRs using PRs of a datacenter (e.g., such as configuration and operation of CRs 113 using PRs 112 of one or more of the DDCs 110) will be understood by one skilled in the art.

The DDCs 110 of cloud environment 109 may be arranged in various ways. The DDCs 110 (or at least a portion of the DDCs 110) may be distributed geographically. The DDCs 110 may be located at any suitable geographic locations. The DDCs 110 may be distributed across a geographic area of any suitable size (e.g., globally, on a particular continent, within a particular country, within a particular portion of a country, or the like). The DDCs 110 (or at least a portion of the DDCs 110) may be located relatively close to the end users. The DDCs 110 (or at least a portion of the DDCs 110) may be arranged hierarchically (e.g., with larger DDCs 110 having larger amounts of PRs 112) and CRs 113 being arranged closer to the top of the hierarchy (e.g., closer to a core network supporting communications by the larger DDCs 110) and smaller DDCs 110 having smaller amounts of PRs 112 and CRs 113 being arranged closer to the bottom of the hierarchy (e.g., closer to the end users). The DDCs 110 may be provided at existing locations (e.g., where the cloud provider may be a network service provider), at least a portion of the DDCs 110 may be implemented within Central Offices (COs) of the network service provider since, as traditional telecommunications equipment deployed in the COs has become more compact, real estate has become available at the COs and may be used for deployment of servers configured to operate as part of a distributed cloud system and, further, because such COs generally tend to be highly networked such that they may be configured to support the additional traffic associated with a distributed cloud system), standalone locations, or the like, as well as various combinations thereof. It will be appreciated that, although primarily presented with respect to an arrangement in which each of the DDCs 110 communicates via CN 120, communication between DDCs 110 may be provided in various other ways (e.g., via various communication networks or communication paths which may be available between DDCs 110). The DDCs 110 of cloud environment 109 may be arranged in various other ways.

The CN 120 may include any communication network(s) suitable for supporting communications within DCS 100 (e.g., between DDCs 110, between CD 130 and DDCs 110, between CD 130 and CSMS 140, between CSMS 140 and DDCs 110, or the like). For example, CN 120 may include one or more wireline networks or one or more wireless networks, which may include one or more of a Global System for Mobile (GSM) based network, a Code Divisional Multiple Access (CDMA) based network, a Long Term Evolution (LTE) based network, a Local Area Network (LAN), a Wireless Local Area Network(s) (WLAN), a Metropolitan Area Network (MAN), a Wide Area Network (WAN), or the like. The CN 120 includes network resources 121 that may be configured to support communications within DCS 100, including support for communications associated with access and use of CRs 113 of DDCs 110 (e.g., between DDCs 110, between CD 130 and DDCs 110, or the like). For example, network resources 121 may include network elements (e.g., data routing devices, control functions, or the like), communication links, or the like, as well as various combinations thereof.

The CD 130 is a client device configured to function within DCS 100. For example, CD 130 may be configured to communicate with CSMS 140 for purposes of requesting cloud services supported by cloud environment 109. For example, CD 130 may be configured to communicate with DDCs 110 for purposes of accessing and using virtual resources allocated for CD 130 within DDCs 110 responsive to requests for cloud services supported by cloud environment 109. For example, CD 130 may be a thin client, a smartphone, a tablet computer, a laptop computer, a desktop computer, a television set-top-box, a media player, a gateway, a server, a network device, or the like.

The CSMS 140 may be configured to receive a cloud service request for CD 130 (e.g., from CD 130 or from a device that is requesting the cloud service on behalf of CD 130), determine a cloud resource allocation in response to the cloud service request for CD 130, and configure cloud environment 109 to support the cloud service requested for CD 130 (e.g., allocation of CRs 113 within DDCs 110 and, optionally, allocation of network resources 121 of CN 120). An exemplary embodiment of a method by which CSMS 140 may provide such functions is discussed below. The CSMS 140 may be configured to perform various other functions of the capability for distribution of a cloud service within a cloud environment.

Model and Problem Formulation—Cloud Network Model

In the embodiments herein, one may consider a cloud network modeled as a directed graph G=(V,E) with |V|=N vertices and |E|=E edges representing the set of network nodes and links, respectively. In the context of a cloud network, a node represents a distributed cloud location, in which virtual network functions (VNFs) may be instantiated in the form of virtual machines (VMs) over COTS servers, while an edge represents a logical link (e.g., IP link) between two cloud locations. One may denote by $\delta(i) \in V$ the set of neighbor nodes of $i \in V$ in G.

Cloud and network resources are characterized by their processing and transmission capacity and cost, respectively.

In particular, one may define:

$K_i = \{0, 1, \ldots, K_i\}$: the set of possible processing resource units at node i $K_{ij} = \{0, 1, \ldots, K_{ij}\}$: the set of possible transmission resource units at link (i, j)

$C_{i,k}$: the capacity, in processing flow units, resulting from the allocation of k resource units (e.g., VMs) at node i $C_{ij,k}$: the capacity, in transmission flow units, resulting from the allocation of k resource units (e.g., 1G links) at link (i, j)

$w_{i,k}$: the cost of setting up k resource units at node i. $w_{ij,k}$: the cost of setting up k resource units at link (i, j)

$e_i$: the cost per processing flow unit at node i $e_{ij}$: the cost per transmission flow unit at link (i, j)

Model and Problem Formulation—Network Service Model

In some embodiments, a network service $\phi \in \Phi$ may be described by a chain of VNFs. One may denote by $M_\phi = \{1, 2, \ldots, M_\phi\}$ the ordered set of VNFs of service $\phi$. Hence, the tuple $(\phi, m)$, with $\phi \in \Phi$ and $m \in M_\phi$, identifies the m-th function of service $\phi$. One may refer to a client as a source-destination pair (s,d), with s, $d \in V$. A client requesting network service $\phi \in \Phi$ implies the request for the network flows originating at source node s to go through the sequence of VNFs specified by $M_\phi$ before exiting the network at destination node d.

Each VNF has (possibly) different processing requirements, which may also vary among cloud locations. One may denote by $r^{(\phi,m)}$ the processing-transmission flow ratio of VNF $(\phi, m)$. That is, when one transmission flow unit goes through VNF $(\phi, m)$, it occupies $r^{(\phi,m)}$ processing resource units. In addition, the service model also captures the possibility of flow scaling. One may denote by $\xi^{(\phi,m)} > 0$ the scaling factor of VNF $(\phi, m)$. That is, the size of the output flow of VNF $(\phi, m)$ may be) $\xi^{(\phi,m)}$ times larger than its input flow. One may refer to a VNF with $\xi^{(\phi,m)} > 1$ as an expansion function, and to a VNF with $\xi^{(\phi,m)} < 1$ as a compression function. Moreover, a processing delay $D_i^{(\phi,m)}$ (in time units) may be incurred in executing VNF $(\phi, m)$ at node i, as long as the processing flow satisfies the node capacity constraint.

One may note that the service model applies to a wide range of cloud services that go beyond VNF services, and that includes, for example, Internet of Things (IoT) services, expected to largely benefit from the proximity and elasticity of distributed cloud networks.

One may adopt a multi-commodity-chain flow model, in which a commodity represents a network flow at a given stage of a service chain. One may use the triplet $(d,\phi,m)$ to identify a commodity flow that may be output of the m-th function of service $\phi$ for client d. The source commodity of service $\phi$ for client d may be identified by $(d,\phi,0)$ and the final commodity delivered to d by $(d,\phi,M_\phi)$, as illustrated in FIG. 2.

Figure 2:
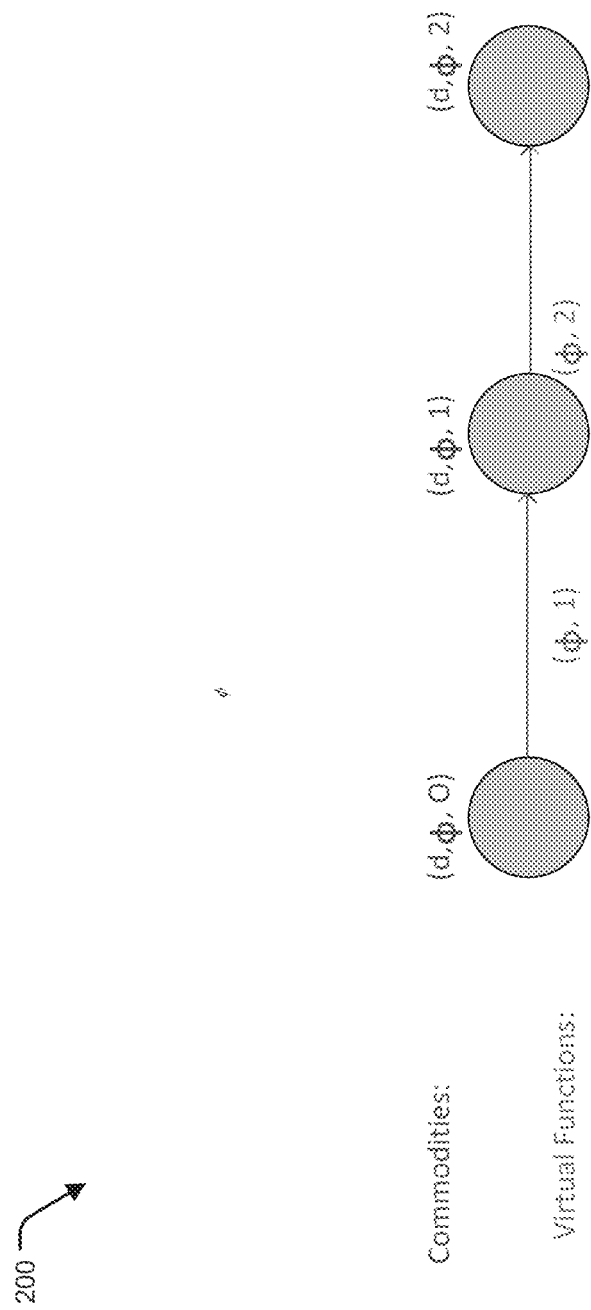
FIG. 2 illustrates a network service chain 200.

FIG. 2 illustrates a network service chain 200. Network service chain 200 may include $\phi \in \Phi$ composed of $M_\phi = 2$ functions. Service $\phi$ takes source commodity $(d,\phi,0)$ and delivers final commodity $(d,\phi,2)$ after going through the sequence of functions $\{(\phi,1),(\phi,2)\}$. VNF $(\phi, m)$ takes commodity $(d,\phi,m-1)$ and generates commodity $(d,\phi,m)$.

Model and Problem Formulation—Queuing Model

In some embodiments one may consider a time slotted system with slots normalized to integral units $t \in \{0, 1, 2, \ldots\}$. One may denote by $a_i^{(d,\phi,m)}(t)$ the exogenous arrival rate of commodity $(d,\phi,m)$ at node i during timeslot t, and by $\lambda_i^{(d,\phi,m)}(t)$ the expected value of $a_i^{(d,\phi,m)}(t)$, referred to as average input rate. One may assume that $a_i^{(d,\phi,m)}(t)$ may be independently and identically distributed (i.i.d.) across timeslots.

At each timeslot t, every node makes a transmission and processing decision on all of its output interfaces. One may use $\mu_{ij}^{(d,\phi,m)}(t)$ to denote the assigned flow rate at link (i, j) for commodity $(d,\phi,m)$ at time t, $\mu_{i,pr}^{(d,\phi,m)}(t)$ to denote the assigned flow rate from node i to its processing unit for commodity $(d,\phi,m)$ at time t, and $\mu_{i,pr}^{(d,\phi,m)}(t)$ to denote the assigned flow rate from node i's processing unit to node i for commodity $(d,\phi,m)$ at time t.

During network evolution, internal network queues buffer packets according to their commodities. One may define the queue backlog of commodity $(d,\phi,m)$ at node i, $Q_i^{(d,\phi,m)}(t)$, as the amount of commodity $(d,\phi,m)$ in the queue of node i at the beginning of timeslot t. The $Q_i^{(d,\phi,m)}(t)$ process evolves according to the following queuing dynamics ($[x]^+$ may be used to denote max{x,0}):

$$Q_i^{(d,\phi,m)}(t+1) \le \left[Q_i^{(d,\phi,m)}(t) - \sum_{j\in\delta(i)} \mu_{ij}^{(d,\phi,m)}(t) - \mu_{i,pr}^{(d,\phi,m)}(t)\right]^+ + \sum_{j\in\delta(i)} \mu_{ji}^{(d,\phi,m)}(t) + \mu_{pr,i}^{(d,\phi,m)}(t) + a_i^{(d,\phi,m)}(t). \quad (1)$$

In addition, at each timeslot t, cloud network nodes may also make resource allocation decisions. One may denote by $y_{ij,k}(t)$ the binary variable indicating the allocation of k transmission resource units at link (i, j) in timeslot t, and by $y_{i,k}(t)$ the binary variable indicating the allocation of k processing resource units at node i in timeslot t.

Model and Problem Formulation—Problem Formation

The problem formation goal may include designing a control algorithm that, given exogenous arrival rates with average input rate matrix $\lambda=(\lambda_i^{(d,\phi,m)})$, may support all service demands while minimizing the average cloud network cost. Specifically, one may require the cloud network to be rate stable, i.e., $$\lim_{t\to\infty} \frac{Q_i^{(d,\phi,m)}(t)}{t} = 0 \text{ withprob.} 1 \ \forall\, i, (d, \phi, m). \quad (2)$$

The dynamic service distribution problem (DSDP) may then be formulated as follows:

$$\min\limsup_{t\to\infty} \frac{1}{t}\sum_{\tau=0}^{t-1} E\{h(\tau)\} \quad (3)$$

such that the cloud network may be rate stable with input rate $\lambda$ (4)

$$\mu_{pr,i}^{(d,\phi,m)}(\tau) = \xi^{(\phi,m)} \mu_{i,pr}^{(d,\phi,m-1)}\left(\tau - D_i^{(\phi,m)}\right) \quad (5)$$

$\forall\, i, d, \phi, m > 0, \tau$ $$\sum_{(d,\phi,m>0)} \mu_{i,pr}^{(d,\phi,m-1)}(\tau) r^{(\phi,m)} \le \mu_i(\tau) \le \sum_{k\in K_i} C_{i,k} y_{i,k}(\tau) \quad (6)$$

$\forall\, i, \tau$ $$\sum_{(d,\phi,m)} \mu_{ij}^{(d,\phi,m)}(\tau) \le \mu_{ij}(\tau) \le \sum_{k\in K_{ij}} C_{ij,k} y_{ij,k}(\tau) \quad (7)$$

$\forall\, (i, j), \tau$ $$\mu_{i,pr}^{(d,\phi,m)}(\tau), \mu_{pr,i}^{(d,\phi,m)}(\tau), \mu_{ij}^{(d,\phi,m)}(\tau) \in R^+ \quad (8)$$

$\forall\, i, (i, j), d, \phi, m, \tau$ $$y_{i,k}(\tau), y_{ij,k}(\tau) \in \{0, 1\} \quad (9)$$

$\forall\, i, (i, j), d, \phi, m, \tau$ where (5) describes the instantaneous commodity-chain constraints, (6) and (7) are instantaneous transmission and processing capacity constrains, and the cost function $h(\tau)$ may be given by $$h(\tau) = \sum_{i\in V}\left(e_i\mu_i(\tau) + \sum_{k\in K_i} w_{i,k}y_{i,k}(\tau)\right) + \sum_{(i,j)\in E}\left(e_{ij}\mu_{ij}(\tau) + \sum_{k\in K_{ij}} w_{ij,k}y_{ij,k}(\tau)\right). \quad (10)$$

In the following section, one may present a dynamic control algorithm that obtains arbitrarily close to optimal solutions to the above problem formulation in a fully distributed fashion.

Dynamic Cloud Network Control

In some embodiments, one may first describe a distributed dynamic cloud network control (DCNC) strategy that extends the Lyapunov drift-plus-penalty algorithm to account for both transmission and processing flow scheduling and resource allocation decisions. One may then show that DCNC provides arbitrarily close-to-optimal solutions with probability 1. Finally, one may present E-DCNC, an enhanced dynamic cloud network control algorithm that introduces a shortest transmission-plus-processing distance bias to reduce network delay without compromising throughput or average cloud network cost.

DCNC Algorithm

Local transmission decisions: At the beginning of each timeslot t, each node i observes the queue backlogs of all its neighbors and performs the following operations for each of its outgoing links (i, j), $j\in\delta(i)$:

1. For each commodity $(d,\phi,m)$, compute the transmission utility weight
$W_{ij}^{(d,\phi,m)}(t)=[Q_i^{(d,\phi,m)}(t)-Q_j^{(d,\phi,m)}(t)-Ve_{ij}]^+$ where V may be a non-negative control parameter that determines the degree to which cost minimization is emphasized.

2. Compute the optimal commodity $(d,\phi,m)^*$ as:

$$(d, \phi, m)^* = \underset{(d,\phi,m)}{\mathrm{argmax}}\left\{W_{ij}^{(d,\phi,m)}(t)\right\}$$

3. If $W_{ij}^{(d,\phi,m)*}(t)=0$, then, $k^*=0$. Otherwise, $$k^* = \underset{k}{\mathrm{argmax}}\left\{C_{ij,k} W_{ij}^{(d,\phi,m)*}(t) - Vw_{ij,k}\right\}$$

4. Take the following resource allocation and flow rate assignment decisions:

$y_{ij,k^*}(t)=1$ $y_{ij,k}(t)=0 \ \forall k\ne k^*$ $\mu_{ij}^{(d,\phi,m)*}(t)=C_{ij,k^*}$ $\mu_{ij}^{(d,\phi,m)}(t)=0 \ \forall (d,\phi,m)\ne(d,\phi,m)^*$ Local processing decisions: At the beginning of each timeslot t, each node i observes its local queue backlogs and performs the following operations:
1. For each commodity (d,ϕ,m), compute the processing utility weight $$W_i^{(d,\phi,m)}(t) = \frac{1}{r^{(\phi,m+1)}}\left[Q_i^{(d,\phi,m)}(t) - \xi^{(\phi,m[0.6]+1)}Q_i^{(d,\phi,m[0.6]+1)}(t) - Ve_i\right]^+$$

The processing utility weight $W_i^{(d,\phi,m)}(t)$ indicates the benefit of executing function (ϕ, m+1) to process commodity (d,ϕ,m) into commodity (d,ϕ, m+1) at time t, in terms of the local backlog reduction per processing unit cost.

2. Compute the optimal commodity (d,ϕ,m)* as:

$$(d,\phi,m)^* = \operatorname*{argmax}_{(d,\phi,m)}\{W_i^{(d,\phi,m)}(t)\}$$

3. If $W_i^{(d,\phi,m)*}(t)=0$, then, k*=0. Otherwise, $$k^* = \operatorname*{argmax}_k \{C_{i,k}W_i^{(d,\phi,m)*}(t) - Vw_{i,k}\}$$

4. Take the following resource allocation and flow rate assignment decisions:

$$y_{i,k^*}(t) = 1$$
$$y_{i,k}(t) = 0$$
$$\forall k \neq k^*$$
$$\mu_{i,pr}^{(d,\phi,m)^*}(t) = \frac{1}{r^{(\phi,m+1)^*}}C_{i,k^*}$$
$$\mu_{i,pr}^{(d,\phi,m)}(t) = 0$$
$$\forall (d,\phi,m) \neq (d,\phi,m)^*$$

Observe from the above algorithm description that the finite processing delay $D_i^{(\phi,m)}$ may not be involved in the implementation of DCNC. The reason is that omitting $D_i^{(\phi,m)}$ in the scheduling decisions of DCNC does not affect the throughput optimality or the average cost convergence.

Delay Improvement Via Enhanced Dynamic Cloud Network Control (E-DCNC)

The DCNC algorithm determines the routes and the service distribution according to the evolving backlog accumulation in the network. However, queue backlogs have to build up in the appropriate direction before yielding efficient routes and service distribution, which may result in degraded delay performance.

The delay performance of multi-hop queuing networks may be improved by introducing a bias term into the weight of the dynamic control algorithm, where the bias term represents the number of hops or the geometric distance to the destination. Control decisions are then made based on the joint observation of the backlog state and the bias term. In order to leverage this technical track to reduce end-to-end delay in cloud networks, the bias term needs to capture the effect of both transmission and processing delay. Accordingly, one may propose E-DCNC, and enhanced DCNC algorithm designed to reduce cloud network delay. Specifically, for each queue backlog $Q_i^{(d,\phi,m)}(t)$, one may define a modified queue backlog $\tilde{Q}_i^{(d,\phi,m)}(t)$:

$$\tilde{Q}_i^{(d,\phi,m)}(t) \triangleq Q_i^{(d,\phi,m)}(t) + \eta Y_i^{(d,\phi,m)}, \quad (13)$$

where $Y_i^{(d,\phi,m)}$ denotes the shortest transmission-plus-processing distance bias term, and η may be a control parameter representing the degree to which one may emphasize the bias with respect to the backlog. Furthermore, one may define $$Y_i^{(d,\phi,m)} \triangleq \begin{cases} \min_{j \in V}\{H_{ij} + D_j^{(\phi,m)}\}; & 0 \leq m < M_\phi \\ H_{id}, & m = M \end{cases} \quad (14)$$

where $H_{ij}$ represents the number of hops from node i to node j along the shortest path. E-DCNC may be formed by using $\tilde{Q}_i^{(d,\phi,m)}(t)$ in place of $Q_i^{(d,\phi,m)}(t)$ in the DCNC algorithm, and modifying the condition for choosing k*=0 to be as follows (see step 3 of DCNC algorithm description):

For local transmission decisions: $\tilde{W}_{ij}^{(d,\phi,m)*}(t)=0$ or $Q_i^{(d,\phi,m)}(t)=0$;

For local processing decisions: $\tilde{W}_i^{(d,\phi,m)*}(t)=0$ or $Q_i^{(d,\phi,m)}(t)=0$;

The motivation of changing the condition for setting k*=0 may be to avoid unnecessary resource consumption when $\tilde{W}_{ij}^{(d,\phi,m)*}(t)$ or $\tilde{W}_i^{(d,\phi,m)*}(t)$ are positive, but the queue of commodity) (d,ϕ,m)* may be empty.

It may be shown that the throughput optimality and average resource cost efficiency of E-DCNC may be guaranteed. Moreover, as shown by simulation experiments, a significantly lower congestion level may be achieved under E-DCNC, demonstrating enhanced delay performance, particularly when the network is lightly loaded, without compromising overall throughput nor cloud network cost. In fact, note that with the bias term defined in (14) and under light traffic load, for commodities that require further processing, $0 \leq m < M_\phi$, flows tend to be routed along the path with the smallest combined transmission-processing delay, while for final commodities, $m=M_\phi$, data flows follow the shortest path to their corresponding destination node d.

Figure 3:
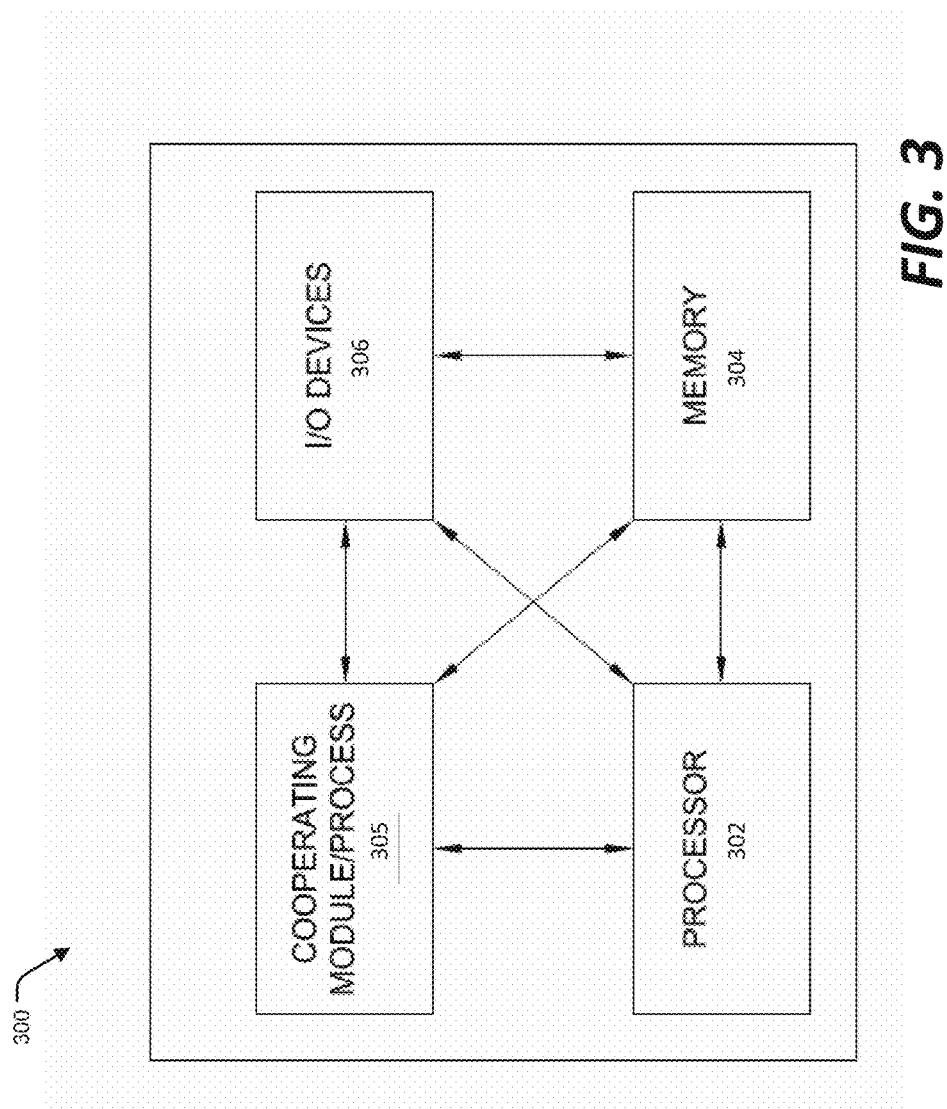
FIG. 3 depicts a high-level block diagram of a computer suitable for use in performing functions described herein.

FIG. 3 depicts a high-level block diagram of a computer suitable for use in performing functions described herein.

The computer 300 includes a processor 302 (e.g., a central processing unit (CPU) and/or other suitable processor(s)) and a memory 304 (e.g., random access memory (RAM), read only memory (ROM), and the like).

The computer 300 also may include a cooperating module/process 305. The cooperating process 305 may be loaded into memory 304 and executed by the processor 302 to implement functions as discussed herein and, thus, cooperating process 305 (including associated data structures) may be stored on a computer readable storage medium, e.g., RAM memory, magnetic or optical drive or diskette, and the like.

The computer 300 also may include one or more input/output devices 306 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 300 depicted in FIG. 3 provides a general architecture and functionality suitable for implementing functional elements described herein and/or portions of functional elements described herein. For example, the computer 300 provides a general architecture and functionality suitable for implementing one or more of an element of a DDC 110, a portion of an element of a DDC 110, an element of CN 120, a portion of an element of CN 120, CD 130, a portion of CD 130, CSMS 140, a portion of CSMS 140, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that at least some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media (e.g., non-transitory computer-readable media), transmitted via a data stream in a broadcast or other signal bearing medium, and/or stored within a memory within a computing device operating according to the instructions.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A network node in a distributed dynamic cloud network, the network node comprising:
   a memory; and
   a processor configured to observe a local queue backlog, for each of a plurality of commodities, wherein each commodity represents a respective network flow at a given stage of a service chain, compute a processing utility weight for each of the plurality of commodities based upon the local queue backlog of the plurality of commodities, and the local queue backlog of another commodity, wherein the other commodity is the succeeding commodity in the service chain, compute an optimal commodity using the processing utility weights, wherein the optimal commodity is the commodity with a highest utility weight, assign a number of processing resource units allocated to a timeslot to zero when the processing utility weight of the optimal commodity is less than or equal to zero, and execute processing resource allocation and processing flow rate assignment decisions based upon the optimal commodity.

2. The network node of claim 1, wherein the processor is further configured to observe a neighbor queue backlog of a neighbor of the network node at the beginning of the timeslot, for each of the plurality of commodities; and compute a transmission utility weight for each of the plurality of commodities based upon the observed neighbor queue backlog, a local queue backlog of the network node, and a transmission cost.

3. The network node of claim 2, wherein the processor is further configured to compute an optimal commodity using the transmission utility weights, where the optimal commodity is the commodity with a highest utility weight.

4. The network node of claim 3, wherein the processor is further configured to assign the number of transmission resource units allocated to the timeslot to zero when transmission utility weight is less than or equal to zero.

5. The network node of claim 4, wherein the processor is further configured to execute transmission resource allocation and transmission flow rate assignment decisions based upon the optimal commodity.

6. The network node of claim 5, wherein the processor is further configured to: introduce a bias term into the transmission utility weight, where the bias term represents a number of hops and/or a geometric distance to a destination.

7. The network node of claim 1, wherein the processor is further configured to, for each commodity $(d,\phi,m)$, compute the processing utility weight as such:

$$W_i^{(d,\phi,m)}(t) = \frac{1}{r^{(\phi,m+1)}} \left[ Q_i^{(d,\phi,m)}(t) - \xi^{(\phi,m[0.6]+1)} Q_i^{(d,\phi,m[0.6]+1)}(t) - Ve_i \right]^+,$$

where the processing utility weight $W_i^{(d,\phi,m)}(t)$ indicates a benefit of executing function $(\phi,m+1)$ to process commodity $(d,\phi,m)$ into commodity $(d,\phi,m+1)$ at time $t$, in terms of a local backlog reduction per processing unit cost.

8. The network node of claim 7, wherein the processor is further configured to compute the optimal commodity $(d,\phi,m)^*$ according to:

$$(d,\phi,m)^* = \underset{(d,\phi,m)}{\mathrm{argmax}} \{ W_i^{(d,\phi,m)}(t) \}.$$

9. The network node of claim 8, wherein the processor is further configured to: assign a number of allocated resource units k*=0 when $W_{ij}^{(d,\phi,m)*}(t)=0$; and otherwise assign $$k^* = \underset{k}{\mathrm{argmax}}\{C_{i,k} W_i^{(d,\phi,m)^*}(t) - Vw_{i,k}\}.$$

10. The network node of claim 9, wherein the processor is further configured to perform the following resource allocation and flow rate assignment decisions:

$$y_{i,k^*}(t) = 1$$
$$y_{i,k}(t) = 0$$
$$\forall k \ne k^*$$
$$\mu_{i,pr}^{(d,\phi,m)^*}(t) = \frac{1}{r^{(\phi,m+1)^*}} C_{i,k^*}$$
$$\mu_{i,pr}^{(d,\phi,m)}(t) = 0$$
$$\forall (d, \phi, m) \ne (d, \phi, m)^*.$$

11. A method of optimizing cloud control on a network node in a distributed dynamic cloud, the method comprising:
  observing a local queue backlog at, for each of a plurality of commodities, wherein each commodity represents a respective network flow at a given stage of a service chain;
  computing a processing utility weight for each of the plurality of commodities based upon the local queue backlog of the plurality of commodities, the local queue backlog of another commodity, wherein the other commodity is the succeeding commodity in the service chain;
  computing an optimal commodity using the processing utility weights, wherein the optimal commodity is the commodity with a highest utility weight;
  assigning a number of processing resource units allocated to a timeslot to zero when the processing utility weight of the optimal commodity is less than or equal to zero; and
  executing processing resource allocation and processing flow rate assignment decisions based upon the optimal commodity.

12. The method of claim 11, further comprising:
  observing a neighbor queue backlog of a neighbor of the network node at the beginning of the timeslot, for each of the plurality of commodities; and
  computing a transmission utility weight for each of the plurality of commodities based upon the observed neighbor queue backlog, a local queue backlog of the network node, and a transmission cost.

13. The method of claim 12, further comprising:
  computing an optimal commodity using the transmission utility weights, where the optimal commodity is the commodity with a highest utility weight.

14. The method of claim 13, further comprising:
  assigning a number of transmission resource units allocated to the timeslot to zero when transmission utility weight is less than or equal to zero.

15. The method of claim 14, further comprising:
  executing transmission resource allocation and transmission flow rate assignment decisions based upon the optimal commodity.

16. The method of claim 15, further comprising:
  introducing a bias term into the transmission utility weight, where the bias term represents a number of hops and/or a geometric distance to a destination.

17. The method of claim 11, further comprising:
  for each commodity $(d,\phi,m)$, computing the processing utility weight as such:

$$W_i^{(d,\phi,m)}(t) = \frac{1}{r^{(\phi,m+1)}} \left[ Q_i^{(d,\phi,m)}(t) - \xi^{(\phi,m[0.6]+1)} Q_i^{(d,\phi,m[0.6]+1)}(t) - Ve_i \right]^+,$$

where the processing utility weight $W_i^{(d,\phi,m)}(t)$ indicates a benefit of executing function $(\phi,m+1)$ to process commodity $(d,\phi,m)$ into commodity $(d,\phi,m+1)$ at time t, in terms of a local backlog reduction per processing unit cost.

18. The method of claim 17, further comprising:
  computing the optimal commodity $(d,\phi,m)^*$ according to:

$$(d, \phi, m)^* = \underset{(d,\phi,m)}{\mathrm{argmax}}\{W_i^{(d,\phi,m)}(t)\}.$$

19. The method of claim 18, further comprising:
  assigning k*=0 when $W_{ij}^{(d,\phi,m)*}(t)=0$; and otherwise assigning $$k^* = \underset{k}{\mathrm{argmax}}\{C_{i,k} W_i^{(d,\phi,m)^*}(t) - Vw_{i,k}\}.$$

20. The method of claim 19, further comprising:
  performing the following resource allocation and flow rate assignment decisions:

$$y_{i,k^*}(t) = 1;$$
$$y_{i,k}(t) = 0$$
$$\forall k \ne k^*;$$
$$\mu_{i,pr}^{(d,\phi,m)^*}(t) = \frac{1}{r^{(\phi,m+1)^*}} C_{i,k^*}; \text{ and}$$
$$\mu_{i,pr}^{(d,\phi,m)}(t) = 0$$
$$\forall (d, \phi, m) \ne (d, \phi, m)^*.$$

* * * * *